J. D. Mets.
Photographic Album.
No. 40702.     Patented Nov. 24, 1863.

Witnesses:
R. F. Campbell
E. Schofer

Inventor:
John D. Mets
by his atty
Mason Fenwick & Lawrence

UNITED STATES PATENT OFFICE.

JOHN D. METS, OF DUBUQUE, IOWA.

IMPROVEMENT IN PHOTOGRAPHIC ALBUMS.

Specification forming part of Letters Patent No. 40,702, dated November 24, 1863.

*To all whom it may concern:*

Be it known that I, JOHN D. METS, of Brooklyn, in the county of Kings and State of New York, have invented a new and useful Improvement in Photograph-Albums; and I do hereby declare that the following is a full, clear, and exact description thereof, reference being had to the accompanying drawings, making a part of this specification, in which—

Figure 1:
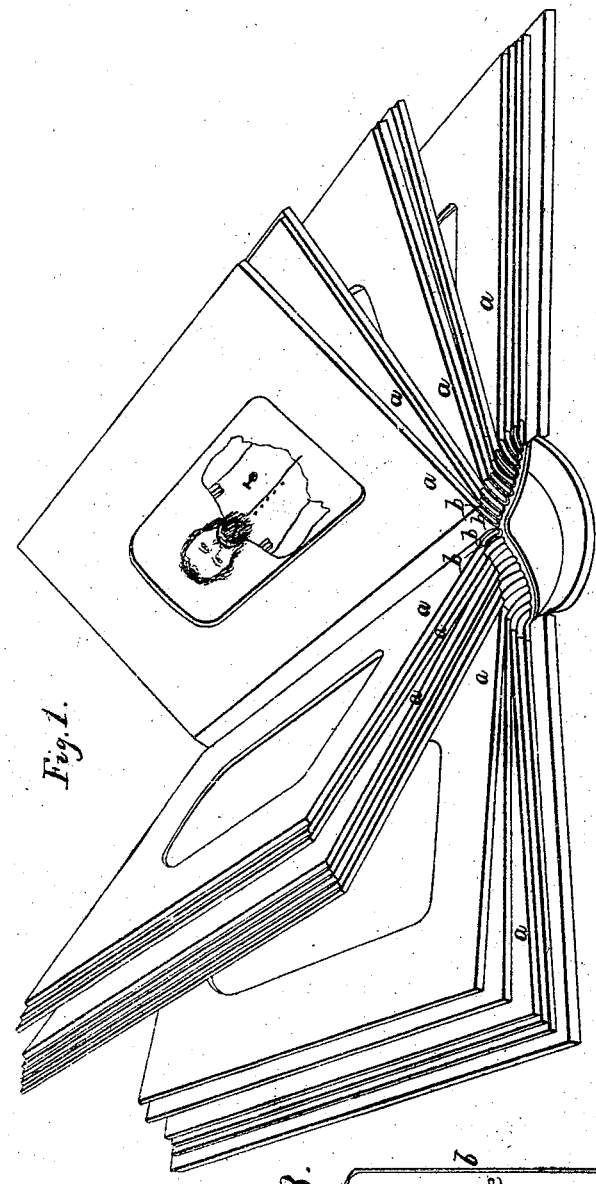
Figure 2:
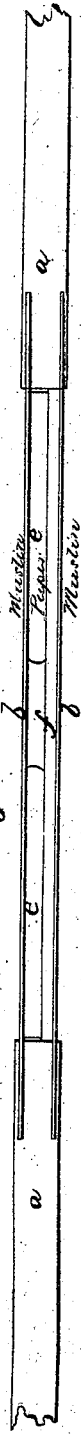
Figure 3:
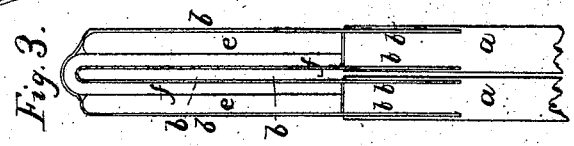

Figure 1 is a perspective view of my improved album. Fig. 2 is a cross-section through two of the leaves, showing the mode of connecting them together. Fig. 3 shows the two leaves closed.

Similar letters of reference indicate corresponding parts in the several figures.

This invention relates to a new mode of constructing that class of albums the leaves of which are required to be very thick and stiff for receiving cards, which are slipped between the thicknesses of the leaves, and which, on account of this stiffness and thickness of the leaves, have not, hitherto been put together very strongly and neatly.

The object of my invention is to construct the leaves of photograph-albums in such manner that while they can be stitched together and bound in the usual manner of binding books the book will when bound present a neat and unique appearance and possess strength and durability, as will be hereinafter described and represented.

To enable others skilled in the art to make and use my invention, I will proceed to describe its construction and operation.

The leaves of photograph-albums are generally made of one thickness of stiff pasteboard, covered on each side with some neat and ornamented paper, and sometimes it is desired to make these leaves very thick to receive two photograph-cards in each, hence arises the difficulty of binding these leaves in a book, so that they will be permanently secured therein.

The mode of binding hitherto adopted has been to glue the edges forming the back of the book to a strip of cloth, or to unite a portion of each leaf to a backing; but these modes are objectionable on account of a want of durability.

My invention consists in uniting the edges of the pieces of pasteboard *a a* together by strips *b b*, of cloth or other like flexible material applied on each side of the pasteboard leaves, as shown in Figs. 2 and 3. The leaves *a a* are now covered with fine paper, which is pasted on each side of each leaf in the usual manner. The strips *b b*, when glued or otherwise attached to the leaves *a a*, form a flexible hinge-joint for the two leaves, and serve as a means whereby the leaves can be stitched to other leaves and bound together, as represented in Fig. 1. It will be seen that if these leaves thus united were bound together in a book, the back of the book would be much narrower than the opposite edge. On account of the difference in thickness between the two pieces of cloth and the two leaves the book could not be shut closely in consequence of this difference in thickness. To remedy this difficulty, I employ a suitable number of strips of paper or other material, which I introduce between the cloth strips *b b* to make up for the difference in thickness of the leaves. These strips are represented clearly in the enlarged Figs. 2 and 3, and they are arranged as follows: The two strips *e e* are not quite equal in width to the space between the back edges of the leaves *a a*. Thus there is left a space between the edges of these strips *e e*. The strip *f* is equal in width to the two strips *e e*, and extends from edge of the leaves *a a*. By this arrangement of the filling-strips a sufficient body of material is made to stitch through and to allow the leaves *a a* to close together when bound in the form of a book. By using three pieces for the filling, each piece being made up of a number of strips of paper or other material, and confined in place between the two connecting strips of cloth, leather, or other suitable material, I form a very flexible back for the leaves, and am enabled to make the back of the book equal in thickness to the front edges thereof. When two leaves are connected together in this way and the filling is properly arranged between the flexible connections, as above described, these leaves are stitched to other leaves and the book is made up in the usual manner.

It will be seen from the above description that I am not only enabled to unite the thick leaves by stitching through two thicknesses of cloth, but I am also enabled to attach the leaves together in the usual manner of stitching leaves in a book—viz., by stitching through the middle of two leaves. The space is left between the edges of the strips of filling *e e*, (shown in Fig. 2,) for the purpose of making this point, which is the middle of the two united leaves, the thinnest, so that it may be stitched through readily, and also so that a flexible joint will be formed at this point to allow the book when made to open fully. There will be more or less flexibility at the point where the leaves are united to their flexible strip; but it is not this joint alone that I depend upon for the flexibility of the backing. It is the flexible backing itself which allows the book to open freely and fully, which backing is made up of strips of paper or other suitable material inserted and disposed in the manner above described between the cloth-uniting strips *b b*.

I am aware that single leaves for containing photograph picture cards have been united so as to form a book by stitching through the back of each leaf separately; and I am also aware that it is not new to make up the back of a photograph album of pieces of cloth and filling-strips; but in neither of these instances have the leaves been united together in pairs by means of strips of cloth having between them the filling-strips disposed so that the leaves may be practicably stitched together in the usual manner of securing leaves in a book.

The advantages of my mode over others are very great, for it will be seen that where leaves are stitched together singly and the stitches are transversely across the back edges of each leaf, which must necessarily be the case if single leaves are stitched together, the joint will be stiff and the attachment will be very frail; but by my mode the stitches will be passed through the flexible backing from the inside of the leaf outward and then back again, leaving long stitches on the inside of the flexible joint of each pair of leaves, thus attaching each pair of leaves together in the usual manner of stitching books and making a very strong and flexible backing.

Having thus described my invention, I claim—

1. Uniting the card-receiving leaves together in pairs by means of flexible strips of cloth or other suitable material inclosing a filling, substantially as described.

2. So disposing the filling-strips *e e f* within the flexible connecting-strips *b b*, that a space will be formed for the reception of the bend of the filling-strip *f* when the leaves are stitched together, substantially as described.

3. Constructing a photograph-album of a series of pairs of leaves stitched together, substantially as described.

Witness my hand in the matter of my application for a patent for improvement in photographic albums.

JOHN D. METS.

In presence of—
CHAS. E. FROST,
THOMAS FORDER.